US012480325B1

(12) United States Patent
Owens

(10) Patent No.: US 12,480,325 B1
(45) Date of Patent: Nov. 25, 2025

(54) SKIMMER COVER ASSEMBLY METHOD

(71) Applicant: Blue Square Manufacturing, LLC, Chandler, AZ (US)

(72) Inventor: Jeremy Owens, Mesa, AZ (US)

(73) Assignee: Blue Square Manufacturing, LLC, Chandler, AZ (US)

(*) Notice: Subject to any disclaimer, the term of this patent is extended or adjusted under 35 U.S.C. 154(b) by 0 days.

(21) Appl. No.: 18/624,414

(22) Filed: Apr. 2, 2024

Related U.S. Application Data

(62) Division of application No. 17/570,506, filed on Jan. 7, 2022, now Pat. No. 11,976,490.

(51) Int. Cl.

| | |
|---|---|
| ***E04H 4/12*** | (2006.01) |
| ***C02F 1/40*** | (2023.01) |
| ***C02F 1/68*** | (2023.01) |
| ***C02F 103/42*** | (2006.01) |

(52) U.S. Cl.
CPC ............ *E04H 4/1272* (2013.01); *C02F 1/40* (2013.01); *C02F 1/68* (2013.01); *C02F 2103/42* (2013.01)

(58) Field of Classification Search
None
See application file for complete search history.

(56) References Cited

U.S. PATENT DOCUMENTS

| | | |
|---|---|---|
| 2,658,625 A | 11/1953 | Rafferty |
| 2,900,079 A | 8/1959 | Pace |
| 2,960,232 A | 11/1960 | Gillette |
| 2,980,256 A | 4/1961 | Nash |
| 3,000,508 A | 9/1961 | Spaulding |
| 3,285,420 A | 11/1966 | Muller |
| 3,297,163 A | 1/1967 | Landon |
| 3,306,448 A | 2/1967 | Baker |
| 3,481,470 A | 12/1969 | Valois |
| 3,567,020 A | 3/1971 | Whitaker |
| 3,567,025 A | 3/1971 | Gillette |
| 3,616,916 A | 11/1971 | Greene |
| 3,620,372 A | 11/1971 | Ehret |
| 3,628,664 A | 12/1971 | Stanwood |
| 3,677,408 A | 7/1972 | Dinizo, Jr. |
| 3,701,427 A | 10/1972 | Howard |
| 3,706,379 A | 12/1972 | Erlich |
| 3,765,534 A | 10/1973 | West et al. |
| 3,792,499 A | 2/1974 | Whitaker |
| 3,815,161 A | 6/1974 | Baker |
| 3,831,897 A | 8/1974 | Stegmeier |

(Continued)

FOREIGN PATENT DOCUMENTS

| | | |
|---|---|---|
| AU | 2014100682 | 7/2014 |
| WO | 2023023788 A1 | 3/2023 |

*Primary Examiner* — Robert J Popovics
(74) *Attorney, Agent, or Firm* — Miller Johnson

(57) ABSTRACT

A method of assembling a skimmer assembly includes providing a housing including a plurality of walls defining a chamber. The method also includes coupling a base member to the plurality of walls. The base member includes a first hub. The method further includes coupling a carriage to the base member. The carriage includes a base wall, a second hub, and a sidewall. The second hub extends from the base wall in a first direction. The sidewall extends from the base wall in a second direction opposite the first direction. The method also includes rotating the second hub within the first hub to change an orientation of the sidewall relative to the housing.

8 Claims, 4 Drawing Sheets

(56) References Cited

U.S. PATENT DOCUMENTS 3,841,487 A 10/1974 Villette
3,856,679 A 12/1974 Jackson
3,910,840 A 10/1975 Adam
3,939,505 A 2/1976 Gross
4,022,690 A 5/1977 Smith
4,126,925 A 11/1978 Jacuzzi
4,154,679 A 5/1979 Farage
4,212,740 A 7/1980 Greene
4,325,462 A 4/1982 Gouzos
4,348,281 A 9/1982 Perry
4,426,286 A 1/1984 Puckett
4,454,035 A 6/1984 Stefan
4,501,659 A 2/1985 Henk
4,637,873 A 1/1987 Desousa
4,707,253 A 11/1987 Rowe
4,725,352 A 2/1988 Haliotis
4,737,279 A 4/1988 Lewis
4,740,307 A 4/1988 Buelteman
4,743,368 A 5/1988 Gates
4,776,908 A 10/1988 Sapp
4,776,953 A 10/1988 Frentzel
4,798,670 A 1/1989 Treene
4,818,389 A 4/1989 Tobias
4,826,591 A 5/1989 Macia
4,876,001 A 10/1989 Supra
4,879,772 A 11/1989 Meloney, Jr.
4,913,810 A 4/1990 Hodak
5,124,032 A 6/1992 Newhard
5,154,821 A 10/1992 Reid
5,181,283 A 1/1993 Gillebaard
5,202,020 A 4/1993 Desjoyaux
5,225,075 A 7/1993 Cunningham
5,234,588 A 8/1993 Aymes
5,285,538 A 2/1994 Hodak
5,352,358 A 10/1994 Davey
5,554,277 A 9/1996 Rief
5,581,826 A 12/1996 Edwards
5,604,939 A 2/1997 Widener
5,605,622 A 2/1997 Ferraro
5,750,022 A 5/1998 Blake
5,753,112 A 5/1998 Barnes
5,785,846 A 7/1998 Barnes
5,862,541 A 1/1999 Mailhot
5,879,547 A 3/1999 Desjoyaux
5,888,386 A 3/1999 Enright
5,935,450 A 8/1999 Benedict
6,007,714 A 12/1999 Keith
6,022,481 A 2/2000 Blake
6,071,403 A 6/2000 Usher
6,080,324 A 6/2000 Pleva
RE36,913 E 10/2000 Ferraro
6,136,206 A 10/2000 Butcher
6,180,017 B1 1/2001 Usher
6,393,628 B1 5/2002 Kellogg
6,471,856 B1 10/2002 Keith
6,572,765 B2 6/2003 Lincke
6,592,756 B1 7/2003 Felix, Jr.
6,685,843 B2 2/2004 Leaverton
6,701,542 B2 3/2004 Marbach
6,706,174 B1 3/2004 Keith
6,716,342 B1 4/2004 Tilsner
6,755,967 B2 6/2004 Voll
6,770,193 B2 8/2004 Foley
6,797,164 B2 9/2004 Leaverton
6,830,680 B2 12/2004 Queirel
6,878,266 B2 4/2005 Leaverton
6,893,557 B2 5/2005 Harris-Griffin
6,939,463 B2 9/2005 Leaverton
6,962,660 B2 11/2005 Wybo
6,966,079 B2 11/2005 Stetson
7,011,747 B2 3/2006 Hodak
7,052,612 B2 5/2006 Kelty
7,076,813 B2 7/2006 Stetson
7,144,515 B2 12/2006 Brosemer
7,207,604 B2 4/2007 Wilson
7,300,576 B1 11/2007 Blake
7,309,443 B2 12/2007 Kelty
7,311,821 B2 12/2007 Queirel
7,384,544 B2 6/2008 Meincke
7,390,401 B2 6/2008 Hodak
7,402,242 B2 7/2008 Duckett
7,407,575 B2 8/2008 Braun
7,451,500 B2 11/2008 Baker, Jr. et al.
7,550,078 B2 6/2009 Meagher
7,563,365 B2 7/2009 Pellington
7,699,983 B2 4/2010 Andrei
7,727,387 B2 6/2010 Goggin
7,815,795 B2 10/2010 Parks
7,815,797 B1 10/2010 Keith
7,862,712 B2 1/2011 Tak
7,914,009 B1 3/2011 Gerspach
7,993,515 B2 8/2011 Davies
8,091,934 B2 1/2012 Bair
8,136,176 B2 3/2012 Shebek
8,555,989 B1 10/2013 Agajanian
8,689,369 B2 4/2014 Nelson
8,721,881 B1 5/2014 Smith
8,820,355 B2 9/2014 Sutton
8,864,986 B1 10/2014 Smith
9,194,148 B1 11/2015 Koller
9,260,878 B2 2/2016 Zars
9,284,742 B1 3/2016 Deckard
9,347,234 B2 5/2016 Voss Weyman
9,428,929 B2 8/2016 Prendergast
9,447,595 B1 9/2016 Goettl
9,453,354 B1 9/2016 Goettl
9,476,214 B2 10/2016 Parks
9,539,529 B2 1/2017 Mullis
9,581,478 B1 2/2017 Smith
9,593,500 B1 3/2017 Goettl
9,663,964 B2 5/2017 Kurani
9,761,990 B2 9/2017 Koller
9,822,540 B2 11/2017 Baab
9,874,037 B1 1/2018 Goettl
9,890,547 B1 2/2018 Sirco
9,896,855 B2 2/2018 Angelino
9,932,747 B2 4/2018 Greenwald
9,945,141 B2 4/2018 Goettl
10,036,174 B2 7/2018 Smith
10,132,096 B2 11/2018 Smith
10,138,644 B1 11/2018 Piepenburg
10,161,151 B2 12/2018 Goettl et al.
10,214,931 B2 2/2019 Saccoccio
10,378,228 B2 8/2019 Huang
10,399,016 B2 9/2019 Angelino
10,443,257 B2 10/2019 Greenwald
10,465,405 B2 11/2019 Pain
10,526,808 B2 1/2020 Smith
10,662,666 B2 5/2020 Jackson
10,731,367 B1 8/2020 Willwater
10,816,528 B2 10/2020 Yizhack
10,835,846 B1 11/2020 Carpenter
10,837,189 B2 11/2020 Vogtner
10,851,555 B1 12/2020 Willwater
10,876,311 B1 12/2020 Schmidt
10,876,312 B1 12/2020 Schmidt
10,876,313 B1 12/2020 Schmidt
10,876,314 B1 12/2020 Sirco
10,890,005 B2 1/2021 Ramos
10,920,439 B2 2/2021 Jackson
10,961,737 B2 3/2021 Jackson
11,072,935 B1 7/2021 Yu
11,193,289 B2 12/2021 Ocegueda
11,248,385 B2 2/2022 Willwater
11,331,616 B2 5/2022 Henderson
11,332,950 B2 5/2022 Schmidt
11,524,252 B2 12/2022 Aquilina
11,554,333 B2 1/2023 Farley
11,643,833 B2 5/2023 Barnes
11,708,701 B1 * 7/2023 Erbes .................... E04H 4/1272 210/167.1
11,713,584 B2 * 8/2023 Wilson .................... B01D 39/04 210/167.12
11,725,407 B2 8/2023 Schmidt

(56) References Cited

U.S. PATENT DOCUMENTS

| | | | | |
|---|---|---|---|---|
| 11,739,550 | B2 * | 8/2023 | Afshar | C02F 1/685 210/764 |
| 11,930,791 | B1 * | 3/2024 | Bernier | A01M 1/106 |
| 11,946,279 | B2 * | 4/2024 | Afshar | B01D 37/025 |
| 11,976,490 | B2 * | 5/2024 | Owens | E04H 4/1272 |
| 12,076,667 | B2 * | 9/2024 | Renken | E04H 4/1272 |
| 12,203,287 | B2 * | 1/2025 | Spykerman | E04H 4/1272 |
| 12,241,274 | B2 * | 3/2025 | Owens | C02F 1/40 |
| 2002/0117432 | A1 | 8/2002 | Lincke | |
| 2003/0141232 | A1 | 7/2003 | Queirel | |
| 2003/0205537 | A1 | 11/2003 | Leaverton | |
| 2004/0031738 | A1 | 2/2004 | Harris-Griffin | |
| 2004/0074831 | A1 | 4/2004 | Mhoon | |
| 2004/0104163 | A1 | 6/2004 | Leaverton | |
| 2004/0182766 | A1 | 9/2004 | Kelty | |
| 2004/0205886 | A1 | 10/2004 | Goettl | |
| 2005/0000012 | A1 | 1/2005 | Stetson | |
| 2005/0235408 | A1 | 10/2005 | Stetson | |
| 2006/0070935 | A1 | 4/2006 | Brosemer | |
| 2006/0124521 | A1 | 6/2006 | Hodak | |
| 2006/0163132 | A1 | 7/2006 | Kelty | |
| 2006/0260035 | A1 | 11/2006 | Baker, Jr. | |
| 2006/0289344 | A1 | 12/2006 | Queirel | |
| 2007/0039859 | A1 | 2/2007 | King | |
| 2007/0045163 | A1 | 3/2007 | Meincke | |
| 2007/0163933 | A1 | 7/2007 | Goggin | |
| 2007/0175808 | A1 | 8/2007 | Duckett | |
| 2007/0187311 | A1 | 8/2007 | Braun | |
| 2008/0073257 | A1 | 3/2008 | Foley | |
| 2008/0098507 | A1 | 5/2008 | Pellington | |
| 2008/0099386 | A1 | 5/2008 | Pellington | |
| 2008/0099387 | A1 | 5/2008 | Pellington | |
| 2008/0216877 | A1 | 9/2008 | Lawson | |
| 2008/0272039 | A1 | 11/2008 | Tak | |
| 2009/0120857 | A1 | 5/2009 | Bair | |
| 2009/0139019 | A1 | 6/2009 | Shebek | |
| 2009/0159516 | A1 | 6/2009 | Andrei | |
| 2010/0084325 | A1 | 4/2010 | Parks | |
| 2010/0125942 | A1 | 5/2010 | Nelson | |
| 2010/0230336 | A1 | 9/2010 | Davies | |
| 2010/0314328 | A1 | 12/2010 | Bizon | |
| 2011/0284440 | A1 | 11/2011 | De Souza Sisson | |
| 2012/0248045 | A1 | 10/2012 | Prendergast | |
| 2012/0305498 | A1 | 12/2012 | Palmer | |
| 2014/0076814 | A1 | 3/2014 | Monzingo | |
| 2014/0209546 | A1 | 7/2014 | Smith | |
| 2014/0263101 | A1 | 9/2014 | Voss Weyman | |
| 2015/0068961 | A1 | 3/2015 | Zars | |
| 2015/0354242 | A1 | 12/2015 | Saccoccio | |
| 2016/0028183 | A1 | 1/2016 | Koller | |
| 2016/0222687 | A1 | 8/2016 | Smith | |
| 2016/0230407 | A1 | 8/2016 | Voss Weyman | |
| 2016/0251866 | A1 | 9/2016 | Greenwald | |
| 2016/0289986 | A1 | 10/2016 | Baab | |
| 2016/0305143 | A1 | 10/2016 | Hatlen | |
| 2016/0326762 | A1 | 11/2016 | Goettl | |
| 2017/0030099 | A1 | 2/2017 | Vogtner | |
| 2017/0044785 | A1 | 2/2017 | Angelino | |
| 2017/0101795 | A1 | 4/2017 | Coughlin | |
| 2017/0101796 | A1 | 4/2017 | Goettl | |
| 2017/0175410 | A1 | 6/2017 | Smith | |
| 2017/0184233 | A1 | 6/2017 | Beagen, Jr. | |
| 2017/0350149 | A1 | 12/2017 | Smith | |
| 2018/0142484 | A9 | 5/2018 | Smith | |
| 2018/0147507 | A1 | 5/2018 | Angelino | |
| 2018/0179771 | A1 | 6/2018 | Greenwald | |
| 2018/0222770 | A1 | 8/2018 | Poirier | |
| 2018/0223554 | A1 | 8/2018 | Amico | |
| 2018/0251993 | A1 | 9/2018 | Irvine | |
| 2018/0283027 | A1 | 10/2018 | Huang | |
| 2018/0328058 | A1 | 11/2018 | Smith | |
| 2019/0085578 | A1 | 3/2019 | Smith | |
| 2019/0262748 | A1 | 8/2019 | Mckain | |
| 2019/0284826 | A1 | 9/2019 | Gu | |
| 2019/0360227 | A1 | 11/2019 | Jackson | |
| 2020/0141146 | A1 | 5/2020 | Smith | |
| 2020/0240163 | A1 | 7/2020 | Cabrera | |
| 2020/0284059 | A1 | 9/2020 | Jackson | |
| 2020/0308856 | A1 | 10/2020 | Ramos | |
| 2020/0347629 | A1 | 11/2020 | Jackson | |
| 2020/0370320 | A1 | 11/2020 | Willwater | |
| 2020/0392749 | A1 | 12/2020 | Schmidt | |
| 2020/0392750 | A1 | 12/2020 | Schmidt | |
| 2020/0392751 | A1 | 12/2020 | Schmidt | |
| 2021/0010989 | A1 | 1/2021 | Yizhack | |
| 2021/0039022 | A1 | 2/2021 | Aquilina | |
| 2021/0062527 | A1 | 3/2021 | Schmidt | |
| 2021/0095489 | A1 | 4/2021 | Willwater | |
| 2021/0131132 | A1 | 5/2021 | Blanc Tailleur et al. | |
| 2021/0189753 | A1 | 6/2021 | Schmidt | |
| 2021/0283534 | A1 | 9/2021 | Renken | |
| 2022/0025668 | A1 | 1/2022 | Schmidt | |
| 2022/0049515 | A1 | 2/2022 | Barnes | |
| 2022/0055922 | A1 | 2/2022 | Mendez | |
| 2022/0258091 | A1 | 8/2022 | Henderson | |
| 2022/0372781 | A1 | 11/2022 | Pugliese | |
| 2023/0094680 | A1 * | 3/2023 | Wilson | B01D 29/35 210/167.12 |
| 2023/0108937 | A1 | 4/2023 | Perez | |
| 2023/0220693 | A1 * | 7/2023 | Owens | C02F 1/40 210/167.1 |
| 2023/0220694 | A1 | 7/2023 | Spykerman | |
| 2023/0220695 | A1 * | 7/2023 | Owens | C02F 1/001 222/1 |
| 2023/0250661 | A1 * | 8/2023 | Afshar | E04H 4/1281 210/764 |
| 2023/0313546 | A1 * | 10/2023 | Wilson | B01D 39/04 210/167.12 |
| 2024/0191530 | A1 * | 6/2024 | Dickson | E04H 4/1272 |
| 2025/0122739 | A1 * | 4/2025 | Jung | E04H 4/1272 |

* cited by examiner

SKIMMER COVER ASSEMBLY METHOD

CROSS-REFERENCE TO RELATED APPLICATIONS

This application is a divisional of U.S. patent application Ser. No. 17/570,506 filed Jan. 7, 2022, the entire disclosure of which is incorporated by reference.

TECHNICAL FIELD

This disclosure relates generally to a skimmer cover assembly method, and more particularly to a method of assembling an adjustable skimmer cover assembly for use with a swimming pool.

BACKGROUND

This section provides background information related to the present disclosure and is not necessarily prior art. Conventional swimming pools usually include a skimmer assembly for allowing movement of water from the pool into the skimmer assembly. The skimmer assembly often includes an inlet to a filtration system that is powered by an in-line filter pump. Most skimmer assemblies also include a removable lid or cover that, when removed, allows a user to access an interior of the skimmer assembly for repair, cleaning, and/or other purposes, and, when assembled, prevents inadvertent entry of debris and other material into the interior of the skimmer assembly.

When the skimmer assembly is assembled with the pool construction, it is usually desirable for an upper surface of the cover to be flush with an upper surface of a patio or other suitable construct surrounding the pool, and for outer edges of the cover to be aligned with, or face, certain outer edges of the construct surrounding the pool. While known skimmer assemblies and covers for skimmer assemblies have proven acceptable for their intended purposes, there remains a continuous need for improvement in the relevant art.

SUMMARY

This section provides a general summary of the disclosure, and is not a comprehensive disclosure of its full scope or all of its features.

One aspect of the disclosure provides a skimmer assembly. The skimmer assembly includes a housing, a base member, and a carriage. The housing includes a plurality of walls defining a chamber. The base member includes a first sidewall and a first hub. The first sidewall extends from an upper surface of the base member. The first hub extends from a lower surface of the base member. The lower surface is opposite the upper surface. The base member is configured to receive the housing such that the first sidewall at least partially surrounds the housing. The carriage includes a second sidewall and a second hub. The second sidewall extends from an upper surface of the carriage. The first hub extends from a lower surface of the carriage opposite the upper surface of the carriage. The first hub is configured to rotatably receive the second hub.

Implementations of the disclosure may include one or more of the following optional features. In some implementations, the first hub surrounds a portion of the upper surface of the carriage. The second hub may include an end configured to slidably engage the portion of the upper surface of the carriage.

In some implementations, the first hub includes an outer surface defining a first diameter. The second hub may include an inner surface defining a second diameter. The first diameter may be substantially equal to the second diameter.

In some implementations, the base member defines a first hole surrounded by the first hub. The carriage may define a second hole surrounded by the second hub. The chamber may be accessible through the first hole and the second hole.

In some implementations, the second sidewall includes an outer surface having a flange. The flange may include a lower surface extending orthogonal to the second sidewall. The flange may define a wedge shape extending from the second sidewall.

In some implementations, the skimmer assembly includes a cover. The carriage may be configured to removably receive the cover. The second sidewall may at least partially surround the cover. The second sidewall may include an end opposite the upper surface of the carriage. The end may be flush with the upper surface of the carriage.

Another aspect of the disclosure provides a method of assembling a skimmer assembly. The method includes providing a housing including a plurality of walls defining a chamber. The method also includes coupling a base member to the plurality of walls. The base member may include a first hub. The method may further include coupling a carriage to the base member. The carriage may include a base wall, a second hub extending from the base wall in a first direction, and a sidewall extending from the base wall in a second direction opposite the first direction. The method may further include rotating the second hub within the first hub to change an orientation of the sidewall relative to the housing.

This aspect may include one or more of the following optional features. In some implementations, the method includes sliding an end of the first hub along an upper surface of the carriage.

In some implementations, the first hub includes an outer surface, and the second hub includes an inner surface. The method may further include sliding the outer surface along the inner surface while rotating the second hub within the first hub.

In some implementations, the method includes disposing the skimmer assembly within a swimming pool construct having an edge facing the sidewall. Rotating the second hub within the first hub may include orienting the sidewall in a parallel orientation to the edge. The sidewall may include an outer surface having a flange. The flange and the edge may define a gap visible along a line of sight extending in the first direction. The method may further include rotating the second hub within the first hub such that the gap is not visible along the line of sight. The method may further include engaging an entirety of the flange with the swimming pool construct.

In some implementations, the method includes coupling a cover to the carriage such that an end of the sidewall is flush with an upper surface of the cover.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Figure 1:
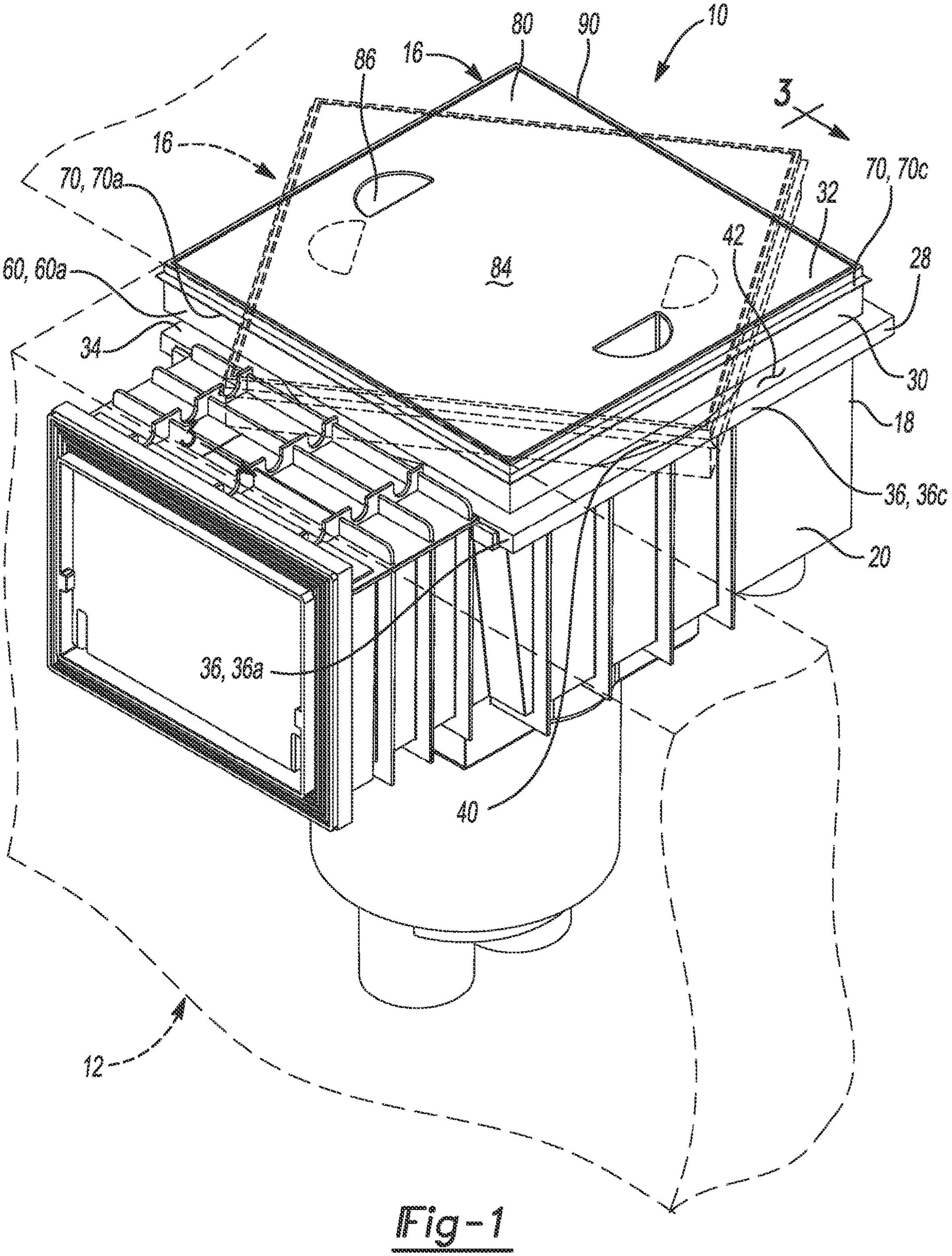
FIG. 1 is a perspective view of a skimmer assembly assembled with a swimming pool construct in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, a skimmer assembly 10 is shown. As will be explained in more detail below, the skimmer assembly 10 may be utilized with, or assembled with, a swimming pool construct 12 in order to perform various functions relative to the water in the pool construct 12. For example, the skimmer assembly 10 maybe used to fill, chlorinate, remove debris, or perform other maintenance-related functions relative to the water in the pool construct 12.

The skimmer assembly 10 may include a housing assembly 14 and a cover assembly 16. In an assembled configuration, the cover assembly 16 may be removably coupled to the housing assembly 14, such that removing the cover assembly 16 from the housing assembly 14 allows a user to access various components within the housing assembly 14.

Figure 2:
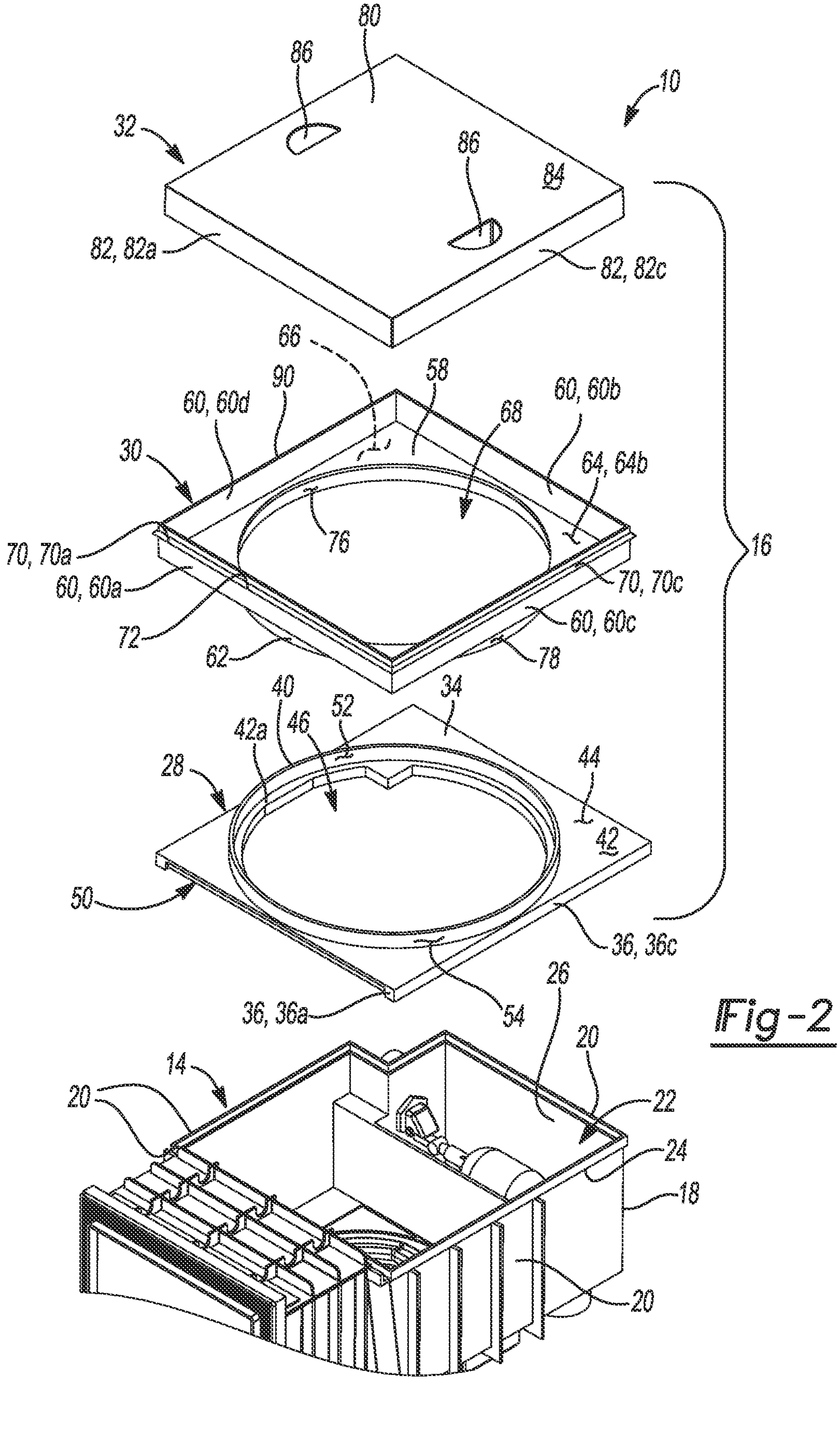
FIG. 2 is an exploded view of a cover assembly of the skimmer assembly of FIG. 1 in accordance with the principles of the present disclosure.

As illustrated in FIG. 2, the housing assembly 14 may include a housing 18 having one or more walls 20 defining a chamber 22. An upper end 24 of the one or more walls 20 may form or otherwise define an opening 26 into, and in fluid communication with, the chamber 22.

Figure 3:
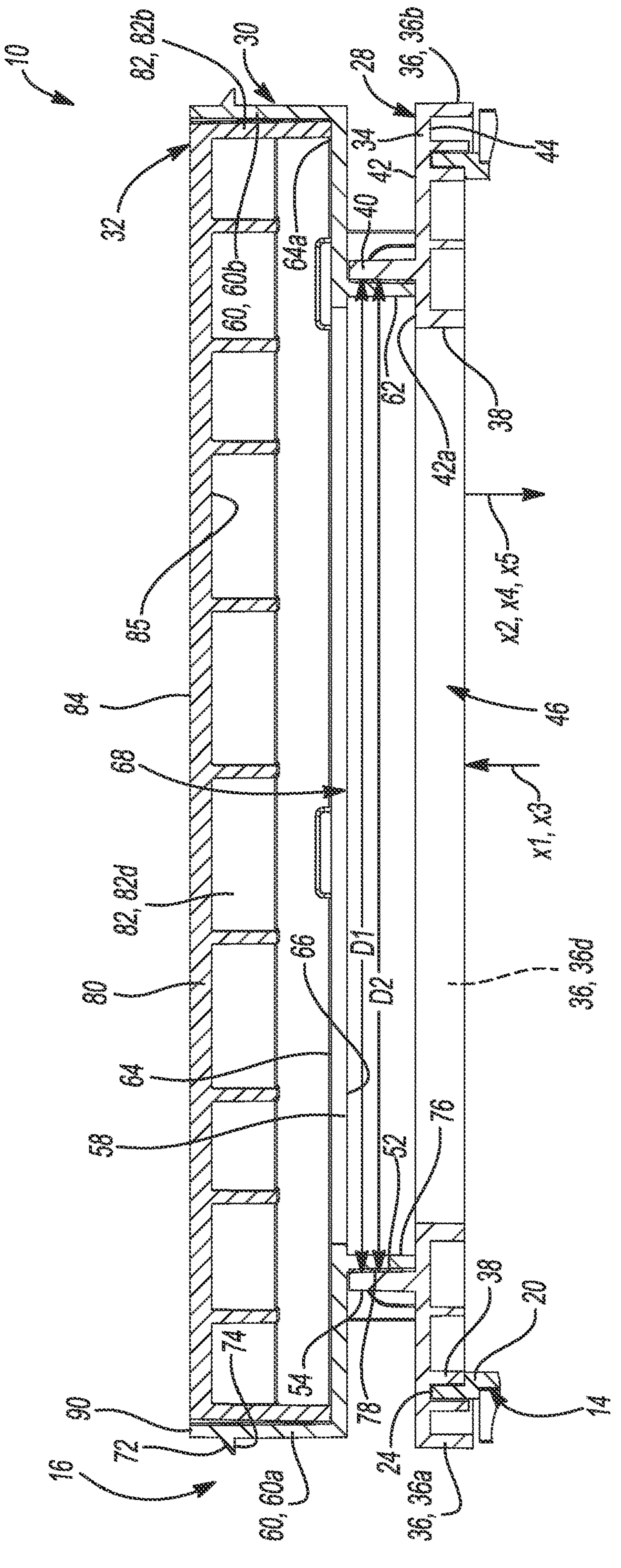
FIG. 3 is a cross-sectional view of the skimmer assembly of FIG. 1 taken through the line 3-3 of FIG. 1.

With reference to FIGS. 2 and 3, the cover assembly 16 may include a base 28 (e.g., a base member 28), a carriage 30, and a cover 32. The base 28 may include an upper wall 34, one or more outer sidewalls 36, one or more inner sidewalls 38, and a hub 40 (e.g., a first hub 40). The upper wall 34 may include an upper surface 42 and a lower surface 44 opposite the upper surface 42. The upper surface 42 and the lower surface 44 may define a hole 46 through the upper and lower surfaces 42, 44. In the assembled configuration, the hole 46 can allow a user to access the chamber 22 of the housing 18.

The outer sidewalls 36 of the base 28 may extend in a first direction X1 from the upper wall 34. In some implementations, the first direction X1 is substantially (e.g., +/−five degrees) perpendicular to the upper and/or lower surfaces 42, 44. Each of the outer sidewalls 36 may be coupled to, and extend from, an adjacent sidewall 36, such that the sidewalls 36 surround at least a portion of the upper wall 34.

In some implementations, the sidewalls 36 include a front sidewall **36*a*, a rear sidewall 36*b* opposite the front sidewall 36*a*, a first lateral sidewall 36*c* extending between the front sidewall 36*a* and the rear sidewall 36*b*, and a second lateral sidewall 36*d* (opposite the first lateral sidewall 36*c*) extending between the front sidewall 36*a* and the rear sidewall 36*b*. In this regard, the sidewalls 36*a*-36*d* may define a portion of a substantially rectangular shaped construct. It will be appreciated, however, that the base 28 may include more or less than four sidewalls 36 defining various other shapes within the scope of the present disclosure. In this regard, the number of, and shape formed by, the sidewalls 36 may correspond to the number of, and shape formed by, the walls 20 of the housing 18. In some implementations, the front sidewall 36*a* defines an opening 50. In the assembled configuration, the opening 50 may receive a wall 20 of the housing 18**.

The hub 40 may extend from the upper surface 42 in a second direction X2 and may include an inner surface 52 and an outer surface 54 opposite the inner surface 52. The second direction X2 may be opposite the first direction X1. In some implementations, the inner surface 52 and the outer surface 54 each define a substantially circular shape such that the hub 40 defines a cylinder. In this regard, the inner surface 52 may define a first diameter D1. The hub 40 (e.g., the inner surface 52) may surround a portion 42*a* of the upper surface 42, such that the portion 42*a* of the upper surface 42 forms a ledge extending from the hole 46 to the inner surface 52 of the hub 40.

The carriage 30 may include a base 58, one or more sidewalls 60, and a hub 62 (e.g., a second hub 62). The base 58 may include an upper surface 64 and a lower surface 66 opposite the upper surface 64. The upper surface 64 and the lower surface 66 may define a hole 68 through the upper and lower surfaces 64, 66. In the assembled configuration, the hole 68 may be aligned with the hole 46 of the base 28 to allow a user to access the chamber 22 of the housing 18.

The sidewalls 60 of the carriage 30 may extend in a third direction X3 from the base 58. In some implementations, the third direction X3 is substantially (e.g., +/−five degrees) perpendicular to the upper and/or lower surfaces 64, 66. Each of the sidewalls 60 may be coupled to, and extend from, an adjacent sidewall 60, such that the sidewalls 60 surround at least a portion of the base 58. In some implementations, the sidewalls 60 include a front sidewall 60*a*, a rear sidewall 60*b* opposite the front sidewall 60*a*, a first lateral sidewall 60*c* extending between the front sidewall 60*a* and the rear sidewall 60*b*, and a second lateral sidewall 60*d* (opposite the first lateral sidewall 60*c*) extending between the front sidewall 60*a* and the rear sidewall 60*b*. In this regard, the sidewalls 60*a*-60*d* may define a portion of a substantially rectangular shaped (e.g., square) construct. It will be appreciated, however, that the carriage 30 may include more or less than four sidewalls 60 defining various other shapes within the scope of the present disclosure. In this regard, the number of, and shape formed by, the sidewalls 60 may correspond to the shape formed by the cover 32.

The sidewalls 60 may surround a portion 64*a* of the upper surface 64. In particular, the portion 64*a* of the upper surface 64 may form a ledge extending from the hole 68 to the sidewalls 60. As will be explained in more detail below, in the assembled configuration, the portion 64*a* of the upper surface 64 may support (e.g., engage) the cover 32.

At least one of the sidewalls 60 may include a flange 70. For example, in some implementations, the front sidewall 60*a* includes a front flange 70*a*, the rear sidewall 60*b* includes a rear flange 70*b* extending from the front flange 70*a*, the first lateral sidewall 60*c* includes a first lateral flange 70*c* extending from the front flange 70*a* to the rear flange 70*b*, and the second lateral sidewall 60*d* includes a second lateral flange 70*d* extending from the front flange 70*a* to the rear flange 70*b*.

Each flange 70 may include an upper surface 72 and a lower surface 74. The lower surface 74 may extend from the respective sidewall 60 in a direction substantially (e.g., +/−5 degrees) perpendicular to the third direction X3, while the upper surface 72 may extend from the respective sidewall 60 at an angle between zero degrees and ninety degrees. In some implementations, the angle at which the upper surface 72 extends from the respective sidewall 60 is substantially (e.g., +/−ten degrees) equal to forty-five degrees, such that the flange 70 forms a wedge shape extending from the sidewalls 60.

As will be explained in more detail below, in the assembled configuration, the lower surface 74 of the flange 70 can face and/or engage a portion of the pool construct 12 surrounding the skimmer assembly 10, while upper surface 72 can form a gradual transition to the portion of the pool construct 12 surrounding the skimmer assembly 10. In some implementations, the flange 70 spans a gap defined between the sidewall(s) 60 and the portion of the pool construct 12 surrounding the skimmer assembly 10.

The hub 62 may extend from the lower surface 66 in a fourth direction X4 and may include an inner surface 76 and an outer surface 78 opposite the inner surface 76. The fourth direction X4 may be opposite the third direction X3. In some implementations, the inner surface 76 and the outer surface 78 each define a substantially circular shape such that the hub 62 defines a cylinder. In this regard, the outer surface 78 may define a second diameter D2. The second diameter D2 may be substantially equal to (e.g., slightly smaller than and/or between 90% and 99.9% of), the first diameter D1 defined by the inner surface 52 of the hub 40 such that, in the assembled configuration, the hub 62 is received within the hub 40. In particular, as will be described in more detail below, the second diameter D2 may be sized such that the hub 62 can rotate within, and translate in the third and/or fourth directions X3, X4 relative to, the hub 40.

While the hub 62 is shown and described herein as being sized such that the hub 62 is rotatably disposed within the hub 40, it will be appreciated that, conversely, the hub 62 may be sized such that the hub 40 is rotatably disposed within the hub 62. A portion 66*a* of the lower surface 66 may surround the hub 62. In particular, the portion 66*a* of the lower surface 66 may form a ledge extending from an outermost edge of the base 58 to the outer surface 78 of the hub 62.

The cover 32 may include a base wall 80 and sidewalls 82 extending from the base wall 80. As previously described, the cover 32, including the base wall 80 and the sidewalls 82, may be sized and shaped such that the cover 32 is received by the carriage 30 in the assembled configuration.

The base wall 80 may include an upper surface 84 and a lower surface 85 opposite the upper surface 84. The upper surface 84 may define one or more apertures 86 to allow a user to engage and remove the cover 32 from the carriage 30 in the assembled configuration in order to access the chamber 22 of the housing 18.

The sidewalls 82 of the cover 32 may extend in a fifth direction X5 from the base wall 80. In some implementations, the fifth direction X5 is substantially (e.g., +/−five degrees) perpendicular to the upper surface 84. Each of the sidewalls 82 may be coupled to, and extend from, an adjacent sidewall 82, such that the sidewalls 82 surround at least a portion of the base wall 80.

In some implementations, the sidewalls 82 include a front sidewall 82*a*, a rear sidewall 82*b* opposite the front sidewall 82*a*, a first lateral sidewall 82*c* extending between the front sidewall 82*a* and the rear sidewall 82*b*, and a second lateral sidewall 82*d* (opposite the first lateral sidewall 82*c*) extending between the front sidewall 82*a* and the rear sidewall 82*b*. In this regard, the sidewalls 82*a*-82*d* may define a portion of a substantially rectangular shaped construct. It will be appreciated, however, that the cover 32 may include more or less than four sidewalls 82 defining various other shapes within the scope of the present disclosure. In this regard, as previously described, the number of, and shape formed by, the sidewalls 82 may correspond to the shape formed by sidewalls 60 of the carriage 30.

In some implementations, a length of the sidewalls 82 extending from the upper surface 84 of the cover 32 in the direction X5 is substantially (e.g., +/−five percent) equal to a length of the sidewalls 60 extending from the upper surface 64 of the carriage 30 in the direction X3 such that, in the assembled configuration, the upper surface 84 of the cover 32 is aligned (e.g., flush) with an end 90 of the sidewalls 60. In particular, the upper surface 84 may be coplanar with the end 90 of the sidewalls.

With reference to FIG. 3, in the assembled configuration, the base 28 of the cover assembly 16 may be coupled to the housing assembly 14. For example, the walls 20 of the housing 18 may be received between the inner and outer sidewalls 36, 38 of the base 28. The carriage 30 may be coupled to the base 28. For example, as previously described, the hub 62 may be rotatably received within the hub 40. In some implementations, the hub 40 may slidably engage the portion 66*a* of the lower surface 66 surrounding the hub 62, and/or the hub 62 may slidably engage the portion 38*a* of the upper surface 42 of the base 28. The cover 32 may be coupled to the carriage 30 such that the sidewalls 82 of the cover 32 engage the portion 64*a* of the upper surface 64 of the carriage 30.

Figure 4A:
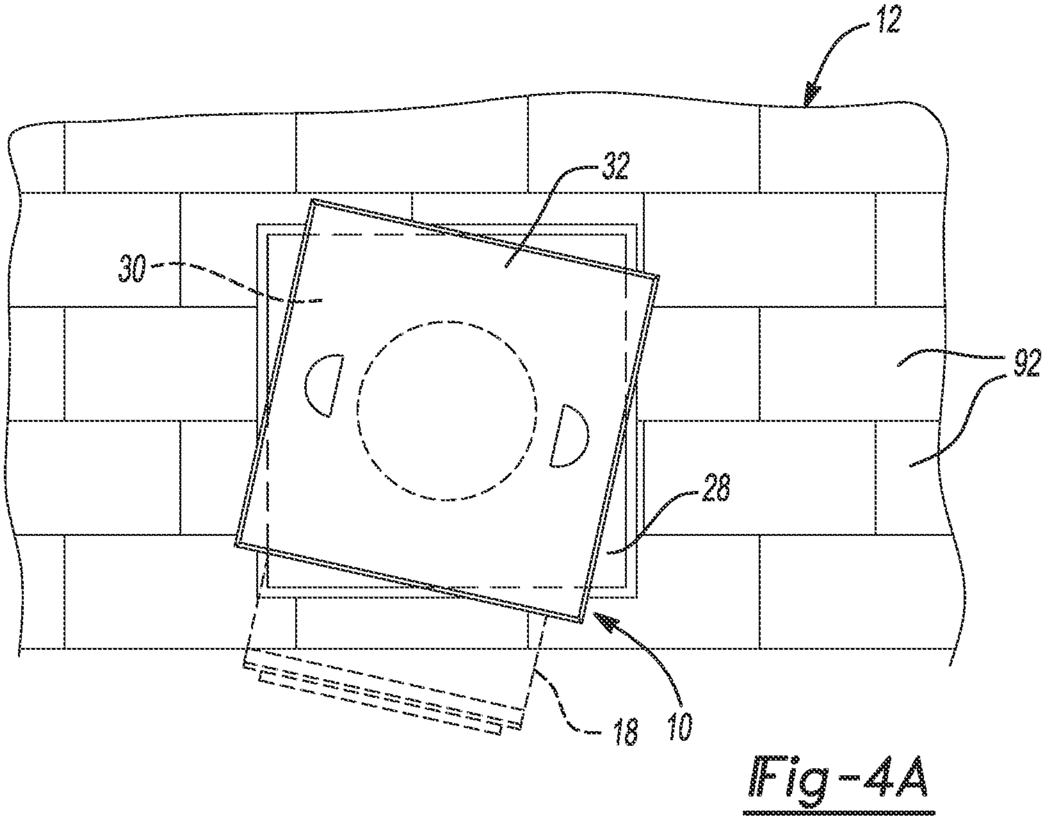
FIG. 4A is a top view of the skimmer assembly of FIG. 1 with a cover assembly in a first orientation.
Figure 4B:
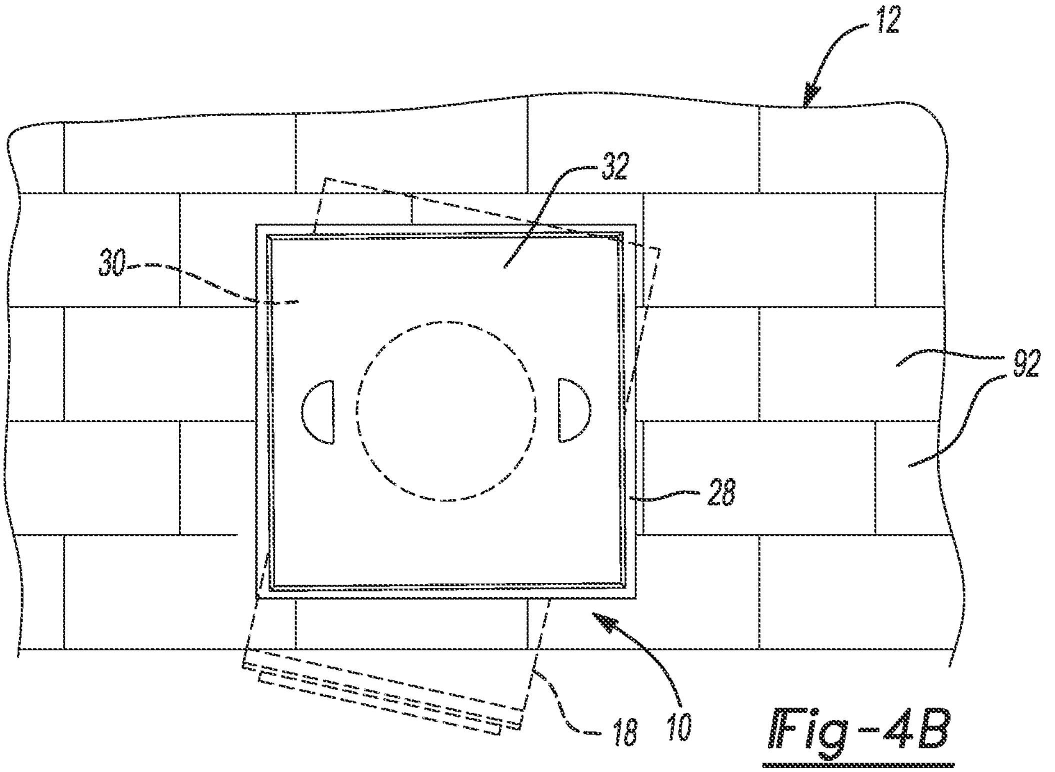
FIG. 4B is a top view of the skimmer assembly of FIG. 1 with a cover assembly in a second orientation.

A method of using the cover assembly 16 will be described with reference to FIGS. 4A and 4B. During use of the cover assembly 16, a user may assemble the cover assembly 16 (e.g., the base 28) to the housing assembly 14, in the manner previously described, within the pool construct 12. As illustrated in FIG. 4A, in some implementations, a portion of a patio (e.g., patio stones 92) may be disposed around the cover assembly 16 such that one or more of the sidewalls 60 of the carriage 30 face a corresponding sidewall of an adjacent patio stone 92 in a non-parallel orientation such that a gap 94 is visible between at least one of the flanges 70 and a corresponding adjacent patio stone 92 when viewed along a line of sight parallel to the direction X5.

In a subsequent step of using the cover assembly 16, the user may rotate the carriage 30 relative to the base 28 such that one or more of the sidewalls 60 of the carriage 30 are parallel to the corresponding sidewall of an adjacent patio stone 92 facing the sidewall 60. For example, the user may rotate the carriage 30 such that the first sidewall 60*a* is parallel to the sidewall of an adjacent patio stone 92 facing the sidewall 60*a*, the second sidewall 60*b* is parallel to the sidewall of an adjacent patio stone 92 facing the sidewall 60*b*, the third sidewall 60*c* is parallel to the sidewall of an adjacent patio stone 92 facing the sidewall 60*c*, and the fourth sidewall 60*d* is parallel to the sidewall of an adjacent patio stone 92 facing the sidewall 60*d*. Similarly, an entirety of the lower surface 74 of each flange 70*a*-70*d* may engage and/or face an upper surface of the corresponding adjacent patio stone 92 such that the gap 94 is not visible between at the flanges 70*a*-70*d* and the corresponding adjacent patio stone 92 when viewed along the line of sight parallel to the direction X5. In this way, the user is able to improve the aesthetic and functional characteristics of the skimmer assembly 10 relative to the pool construct 12.

The following Clauses provide an exemplary configuration for a skimmer assembly and related methods, as described above.

Clause 1: A skimmer assembly comprising: a housing including a plurality of walls defining a chamber; a base member including a first sidewall and a first hub, the first sidewall extending from an upper surface of the base member, the first hub extending from a lower surface of the base member opposite the upper surface, the base member configured to receive the housing such that the first sidewall at least partially surrounds the housing; and a carriage including a second sidewall and a second hub, the second sidewall extending from an upper surface of the carriage, the first hub extending from a lower surface of the carriage opposite the upper surface of the carriage, the first hub configured to rotatably receive the second hub.

Clause 2: The skimmer assembly of Clause 1, wherein the first hub surrounds a portion of the upper surface of the carriage, and wherein the second hub includes an end configured to slidably engage the portion of the upper surface of the carriage.

Clause 3: The skimmer assembly of any of Clauses 1 through 2, wherein the first hub includes an outer surface defining a first diameter, and the second hub includes an inner surface defining a second diameter.

Clause 4: The skimmer assembly of Clause 3, wherein the first diameter is substantially equal to the second diameter.

Clause 5: The skimmer assembly of any of Clauses 1 through 4, wherein the base member defines a first hole surrounded by the first hub, and the carriage defines a second hole surrounded by the second hub.

Clause 6: The skimmer assembly of Clause 5, wherein the chamber is accessible through the first hole and the second hole.

Clause 7: The skimmer assembly of any of Clauses 1 through 6, wherein the second sidewall includes an outer surface having a flange.

Clause 8: The skimmer assembly of Clause 7, wherein the flange includes a lower surface extending orthogonal to the second sidewall.

Clause 9: The skimmer assembly of any of Clauses 7 through 8, wherein the flange defines a wedge shape extending from the second sidewall.

Clause 10: The skimmer assembly of any of Clauses 1 through 9, further comprising a cover, wherein the carriage is configured to removably receive the cover.

Clause 11: The skimmer assembly of Clause 10, wherein the second sidewall at least partially surrounds the cover.

Clause 12: The skimmer assembly of Clause 11, the second sidewall includes an end opposite the upper surface of the carriage, and wherein the end is flush with the upper surface of the carriage.

Clause 13: A method of assembling a skimmer assembly, the method comprising: providing a housing including a plurality of walls defining a chamber; coupling a base member to the plurality of walls, the base member including a first hub; coupling a carriage to the base member, the carriage including a base wall, a second hub extending from the base wall in a first direction, and a sidewall extending from the base wall in a second direction opposite the first direction; and rotating the second hub within the first hub to change an orientation of the sidewall relative to the housing.

Clause 14: The method of Clause 13, further comprising sliding an end of the first hub along an upper surface of the carriage.

Clause 15: The method of any of Clauses 13 through 14, wherein the first hub includes an outer surface, and the second hub includes an inner surface, the method further comprising sliding the outer surface along the inner surface while rotating the second hub within the first hub.

Clause 16: The method of any of Clauses 13 through 15, further comprising disposing the skimmer assembly within a swimming pool construct having an edge facing the at least one sidewall.

Clause 17: The method of Clause 16, wherein rotating the second hub within the first hub includes orienting the sidewall in a parallel orientation to the edge.

Clause 18: The method of Clause 17, wherein the sidewall includes an outer surface having a flange, and wherein the flange and the edge define a gap visible along a line of sight extending in the first direction, the method further comprising rotating the second hub within the first hub such that the gap is not visible along the line of sight.

Clause 19: The method of Clause 18, further comprising engaging an entirety of the flange with the swimming pool construct.

Clause 20: The method of any of Clauses 13 through 19, further comprising coupling a cover to the carriage such that an end of the sidewall is flush with an upper surface of the cover.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method of assembling a skimmer assembly, the method comprising:

providing a housing including a plurality of walls defining a chamber;

coupling a base member to the plurality of walls, the base member including a first hub;

coupling a carriage to the base member, the carriage including a base wall, a second hub extending from the base wall in a first direction, and a sidewall extending from the base wall in a second direction opposite the first direction; and rotating the second hub within the first hub to change an orientation of the sidewall relative to the housing.

2. The method of claim 1, further comprising sliding an end of the first hub along an upper surface of the carriage.

3. The method of claim 1, wherein the first hub includes an outer surface, and the second hub includes an inner surface, the method further comprising sliding the outer surface along the inner surface while rotating the second hub within the first hub.

4. The method of claim 1, further comprising disposing the skimmer assembly within a swimming pool construct having an edge facing the sidewall.

5. The method of claim 4, wherein rotating the second hub within the first hub includes orienting the sidewall in a parallel orientation to the edge.

6. The method of claim 5, wherein the sidewall includes an outer surface having a flange, and wherein the flange and the edge define a gap visible along a line of sight extending in the first direction, the method further comprising rotating the second hub within the first hub such that the gap is not visible along the line of sight.

7. The method of claim 6, further comprising engaging at least a portion of the flange with the swimming pool construct.

8. The method of claim 1, further comprising coupling a cover to the carriage such that an end of the sidewall is flush with an upper surface of the cover.

* * * * *